May 24, 1932.    C. E. HARRIMAN    1,859,441
SHOCK ABSORBER
Filed Sept. 16, 1930    2 Sheets-Sheet 2

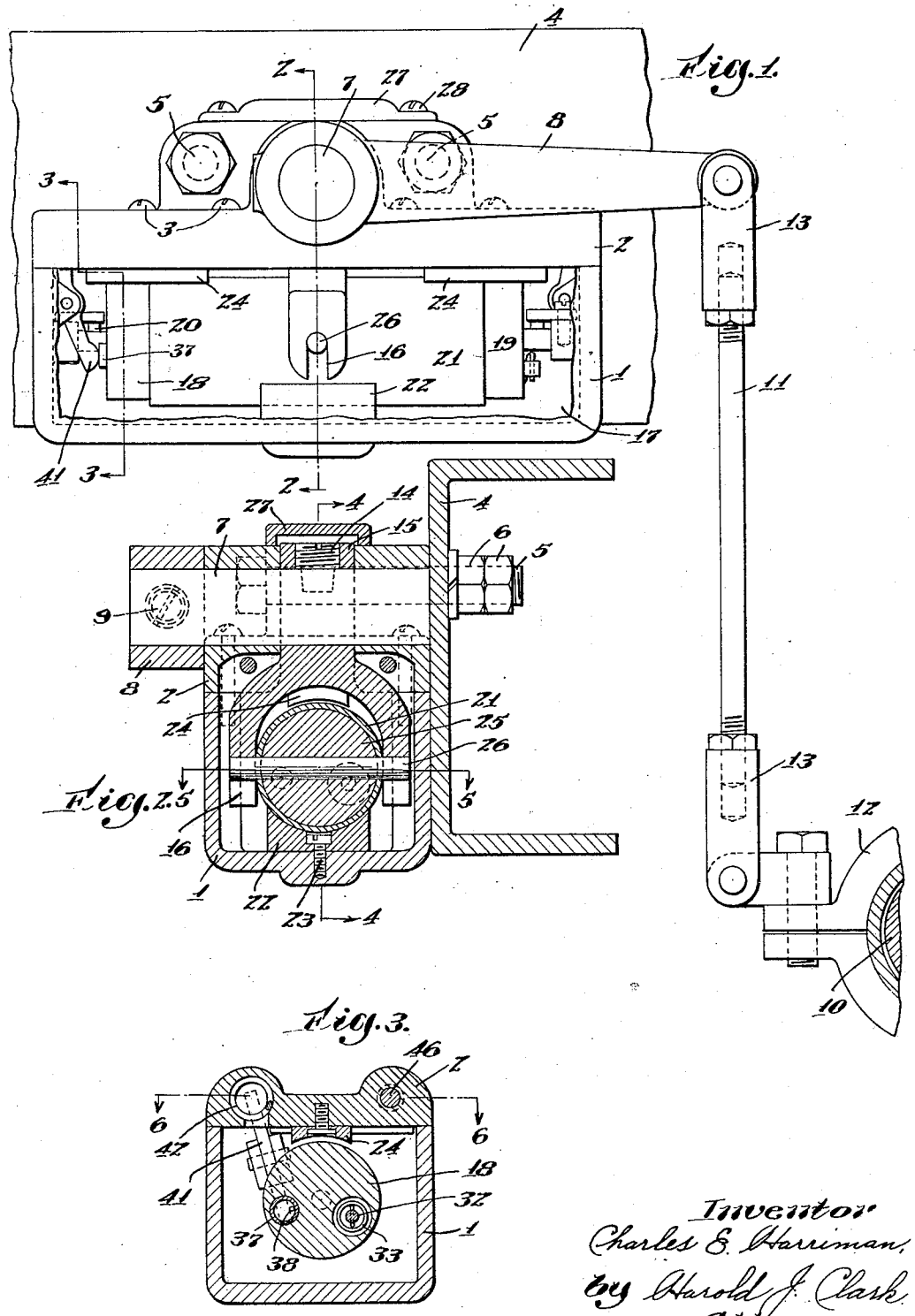

Inventor
Charles E. Harriman,
by Harold J. Clark.
Attorney

Patented May 24, 1932

1,859,441

UNITED STATES PATENT OFFICE

CHARLES E. HARRIMAN, OF WEST BRIDGEWATER, MASSACHUSETTS

SHOCK ABSORBER

Application filed September 16, 1930. Serial No. 482,171.

My present invention relates to shock absorbers particularly adapted and intended for use in conjunction with motor vehicles.

An important object of the present invention is the provision of a shock absorber which will be positive in its shock absorbing or cushioning action in either direction of movement of the vehicle, whether upward or downward, and which will thus substantially eliminate damage to the vehicle due to rough roads, holes, or other abnormal conditions.

Another object of the invention is the provision of a shock absorber which will be economical to manufacture, and simple to construct, assemble and install.

A still further object of the invention resides in the provision of a shock absorber which is readily adjustable, by the operator, to varying degrees of resistance, thus varying the speed of travel of the motor vehicle in an upward or downward direction. No special tools are required to so adjust my novel absorber, the operator being enabled to vary the same to his personal desires in a very few minutes.

Another and important feature of my invention resides in the utilization of a sliding cylinder as the operating device in my novel absorber, said cylinder being preferably reciprocable in a horizontal plane, although it will be understood that this is not essential.

A further feature of the invention resides in the provision of a pair of pistons, held against longitudinal displacement, but vertically movable on their supports, the sliding cylinder above referred to being slidable along said pistons. Said pistons are thus fixed relative to the longitudinal travel of said cylinder.

Other features and objects of the invention reside in the particular construction and arrangement of parts of my novel shock absorber and the above and other objects and features, details of construction, combinations of parts, and advantages, will be hereinafter more fully pointed out, described and claimed.

Referring to the drawings, illustrating a preferred embodiment of the present invention, Fig. 1 is a front elevation of my novel shock absorber in attached position;

Fig. 2 is a vertical sectional view on the line 2—2 of Fig. 1;

Fig. 3 is a vertical sectional view on the line 3—3 of Fig. 1;

Figure 4:
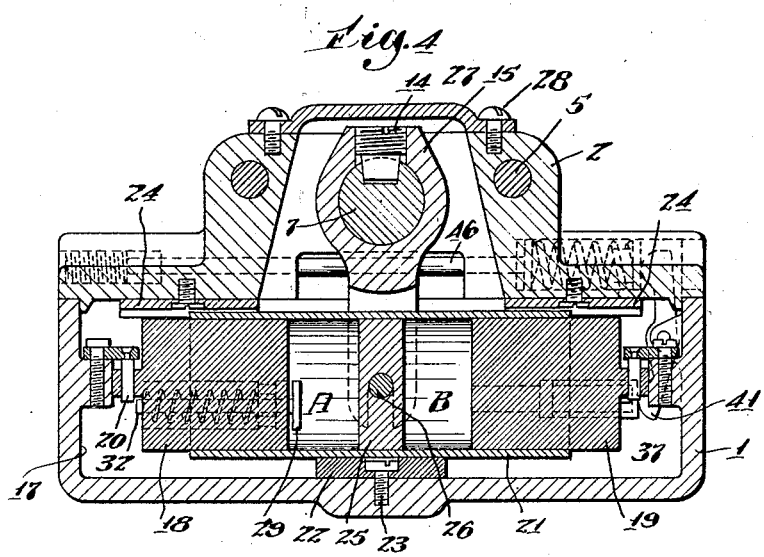
Fig. 4 is a longitudinal sectional view on the line 4—4 of Fig. 2.

Referring now to the drawings for a particular description of the invention, its construction, assembly and operation, my novel shock absorber comprises a casing 1 having a cover 2 attached thereto by means of screws 3, the joint between said casing 1 and cover 2 being sealed in any desirable manner.

The casing is adapted to be affixed to the chassis frame 4 by bolts 5 and nuts 6, as clearly illustrated in Fig. 2. A shaft 7 has a bearing in the top 2, and on the outer end of the shaft 7 is fixed an operating arm or lever 8. This arm 8 may be secured to the shaft 7 by a screw 9, or the shaft 7 may be formed as an integral part of said arm, this being optional with the manufacturer. The operating lever 8 is connected to the axle 10 in any desired manner, preferably by the rigid metallic arm 11 and clamp 12, the arm 11 being adjustable in its end sockets 13, to accommodate motor vehicles having varying distances between axle and chassis. Fixed to the shaft 7 by a screw 14 is a yoke 15 having bifurcated ends or arms 16.

The casing 1 constitutes a fluid reservoir 17, and within said reservoir are positioned two pistons 18 and 19, one end of each piston being vertically slidable on a pin 20, which pins will prevent longitudinal movement of the pistons within the reservoir, but will permit vertical movement thereof. Slidable over the pistons 18 and 19 is a cylinder 21, this cylinder being supported by an arcuate plate 22 fixed to the casing 1 by a screw 23, although said plate 22 may be made an integral part of the casing 1 if desired. Arcuate plates 24 are also provided on the top 2 to constitute guides for the cylinder 21. On the interior of the cylinder 21 and centrally thereof is fixed a web 25, being preferably normally held therein by a press fit. This web 25 divides the space between the heads of the pistons 18 and 19 into two chambers A and B. Projecting through the web 25 and beyond the walls of the cylinder 21 is a rod 26, the projecting ends of said rod being seated in the bifurcated ends 16 of the yoke 15. A cap 27 is fixed to the top 2 by screws 28, this cap constituting a housing of sufficient height to permit rocking of the yoke 15, which extends above the normal height of the top 2, as clearly illustrated in Fig. 4. Said cap also permits easy filling of the absorber with oil or other suitable fluid.

It will thus be seen that any vertical movement of the arm 8, whether upward or downward, will effect a rotative movement of the shaft 7 and hence a rocking of the yoke 15, which in turn, through the medium of the rod 26, will effect a reciprocation of the cylinder 21 along the pistons 18 and 19.

Each piston is provided with a valve 29 and valve seat 30, apertures 31 being provided in the valve seat 30. The valve 29 has a stem 32, and surrounding said stem is a coiled spring 33, said spring being fixed to one end of the stem and having its other end bearing against the under surface of the valve seat 30, the tendency of the spring 33 thus being to keep the valve 29 closed on its seat 30.

A recess 34 is provided in each piston to accommodate or house the valve stem 32 and spring 33. It will thus be seen that communication is obtained between the oil reservoir 17 and chamber A, for example, through the recess 34 and apertures 31 when the valve 29 is in open position, as illustrated in Fig. 4.

Each piston 18 and 19 is also provided with an aperture 35 communicating with a recess 36 within which is seated a sleeve valve 37, this sleeve valve 37 having a port 38 constantly opening into the reservoir 17. The valve 37 has a second port 39, of greater area than the port 38, the port 39, however, being normally covered by the wall 40 of the recess 36. The construction of each of the pistons 18 and 19 is identical, and therefore a description of one will suffice for both.

Pivotally mounted within the casing 1, and at each end thereof, is a rocker 41, adapted to be held against the sleeve valves 37 by the tension of coiled springs 42, said rocker being angularly disposed to effect said connection, as clearly shown. The coiled springs 42 are housed in recesses 43, and each bear between a cap 44 in contact with one end of a rocker 41 and the head 45 of a stem 46. The tension of the springs 42 is adjustable by means of threaded plugs 47 bearing against the opposite end of the stem 46, said plugs 47 being threaded into recesses 48 in the top 2.

Figure 5:
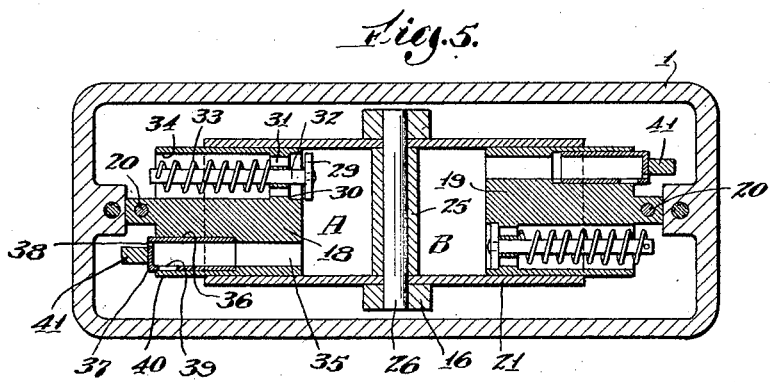
Fig. 5 is a plan sectional view on the line 5—5 of Fig. 2.
Figure 6:
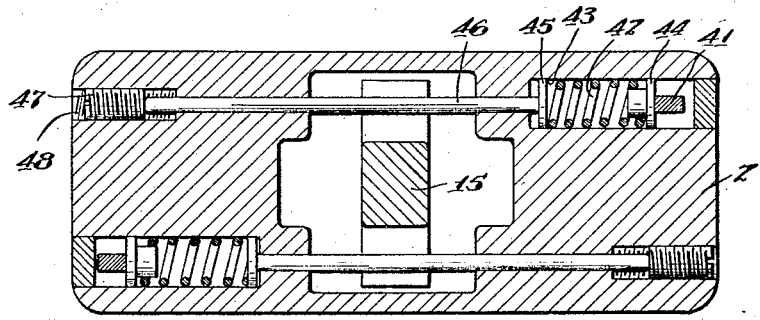
Fig. 6 is a plan sectional view on the line 6—6 of Fig. 3.

The operation of my novel shock absorber is simple, and will be readily understood, being briefly described as follows:

Assuming the device to be attached to an automobile, as illustrated in Fig. 1, and that an obstacle is encountered on the road, effecting a raising of the arm 8, and hence a movement of the yoke arms 16, there will thus be a sliding movement of the cylinder 21 in the direction of the arrow as illustrated in Fig. 5.

This movement of the cylinder 21, and hence of the web 25 will create a suction within the chamber A, opening the valve 29 in the piston 18, and drawing oil or other fluid from the reservoir 17 into the chamber A. Simultaneously with the movement of the web 25 to the right, Fig. 5, there will be a pressure created within the chamber B, forcing a portion of the oil into the chamber B outwardly through the port 38 in the sleeve 37 in the piston 19 and further insuring closure of the valve 29 in said piston.

The size of the port 38, however, is insufficient to take care of abnormal pressure, and continued movement of the web 25 to the right, therefore, will force the sleeve valve 37 outwardly from the piston 19 until the port 39 is in communication with the reservoir 17, thereupon permitting a more rapid discharge of the oil from the chamber B. The outward movement of the sleeve valve 37 from the piston 19, however, will be against the tension of its spring 42, as the outward movement of said sleeve will be against the lower end of its rocker 41, the upper end of said rocker bearing against the cap 44 and spring 42. On the return downward movement of the arm 8 and consequent return of the cylinder 21 and web 25, the action of the valves 29 and sleeves 37 will be reversed, as will be readily understood, thus effectually dampening or cushioning shocks imparted to the absorber.

The ports 38 in the sleeve valves 37 permit a slight flow of oil back and forth between the reservoir 17 and chambers A and B, thus permitting the springs of the motor vehicle to function in a normal manner until a depression, bump, or other road condition is encountered. Said ports 38 will also permit the intake of a small amount of oil on the suction stroke of the web 25.

By means of the plugs 47 the operator of the vehicle is enabled to adjust the absorber to his individual desires, these adjustments being readily performed in a short space of time. An important advantage of my novel absorber resides in the fact that by reason of the wide range of adjustability afforded by my novel device, but one size of shock absorber is required to take care of all sizes and weights of cars, from the lightest to the heaviest.

The economic advantages and benefits of this feature, from the manufacturing and other standpoints, will be instantly apparent to those skilled in the art. The adjustability of said shock absorber, also, enables an operator to compensate the spring pressure for varying seasonal temperatures, without the necessity of establishing special service stations for this work.

My novel shock absorber is strong, rugged and durable, and is capable of withstanding tremendous loads, while at the same time being so adjustable as to also provide the maximum riding comfort to the occupants of small or light vehicles.

It will thus be appreciated that I have devised a simple and yet efficient and positively acting shock absorber, and since I believe the same to be novel, I have therefore claimed said shock absorber broadly in this application.

While I have necessarily described my present invention somewhat in detail, it will be understood and appreciated that I may vary the size, shape, and arrangement of parts within reasonably wide limits, without departing from the spirit of the invention.

My invention is further described and defined in the form of claims as follows:

1. In a shock absorber, a fluid-containing reservoir, a pair of pistons fixed against longitudinal movement but vertically movable in said reservoir, a cylinder slidably mounted on said pistons, and means to reciprocate said cylinder.

2. In a shock absorber, a fluid-containing reservoir, a pair of pistons fixed against longitudinal movement in said reservoir, the heads of said pistons being opposed to and spaced from each other, a cylinder slidably mounted on said pistons, means in said cylinder dividing the space between the heads of said pistons into a pair of fluid-containing chambers, means to reciprocate said cylinder, and means carried by each of said pistons to control the speed of travel of said cylinder.

3. In a shock absorber, a fluid-containing reservoir, a pair of pistons fixed against longitudinal movement in said reservoir, the heads of said pistons being opposed to and spaced from each other, a cylinder slidably mounted on said pistons, means in said cylinder dividing the space between the heads of said pistons into a pair of fluid-containing chambers, means in each of said pistons permitting the flow of fluid from said reservoir into one of said chambers through one of said pistons upon movement of said cylinder in one direction, means in each of said pistons permitting a flow of fluid from the opposite chamber into said reservoir through the opposite piston during movement of said cylinder in said direction, and means to reciprocate said cylinder.

4. In a shock absorber, a fluid-containing reservoir, a pair of pistons fixed against longitudinal movement in said reservoir, the heads of said pistons being opposed to and spaced from each other, a cylinder slidably mounted on said pistons, means in said cylinder dividing the space between the heads of said pistons into a pair of fluid-containing chambers, means in each of said pistons permitting a flow of fluid from said reservoir into one of said chambers through one of said pistons and a flow of fluid from the other of said chambers into the fluid reservoir through the other of said pistons upon movement of said cylinder in either direction, and means to reciprocate said cylinder.

5. In a shock absorber, a fluid-containing reservoir, a pair of pistons fixed against longitudinal movement but vertically movable in said reservoir, a cylinder slidably mounted on said pistons, means to reciprocate said cylinder, and means to limit the speed of travel of said cylinder.

6. In a shock absorber, a fluid-containing reservoir, a pair of pistons fixed against longitudinal movement in said reservoir, a cylinder slidably mounted on said pistons, means to reciprocate said cylinder, means to limit the speed of travel of said cylinder, and manually operable means to adjust said last named means to vary the speed of travel of said cylinder.

7. In a shock absorber, a fluid-containing reservoir, a pair of pistons fixed against longitudinal movement in said reservoir, a cylinder slidably mounted on said pistons, means to reciprocate said cylinder, and fluid controlled means carried by each of said pistons to limit the speed of travel of said cylinder.

8. In a shock absorber, a fluid-containing reservoir, a pair of pistons fixed against longitudinal movement in said reservoir, a cylinder slidably mounted on said pistons, means to reciprocate said cylinder, fluid controlled means carried by each of said pistons and resilient means remote from said pistons to limit the speed of travel of said cylinder.

9. In a shock absorber, a fluid-containing reservoir, a pair of pistons fixed against longitudinal movement in said reservoir, a cylinder slidably mounted on said pistons, means to reciprocate said cylinder, fluid controlled means and resilient means to limit the speed of travel of said cylinder, and manually operable means to adjust said resilient means to vary the speed of travel of said cylinder.

10. In a shock absorber, a fluid-containing reservoir, a pair of pistons fixed against longitudinal movement in said reservoir, a cylinder slidably mounted on said pistons, means to reciprocate said pistons, fluid controlled means carried by each of said pistons to limit the speed of travel of said cylinder, and resilient means remote from said fluid controlled means cooperating therewith to further limit the speed of travel of said cylinder.

11. In a shock absorber, a fluid-containing reservoir, a pair of pistons fixed against longitudinal movement in said reservoir, a cylinder slidably mounted on said pistons, means to reciprocate said pistons, fluid controlled means to limit the speed of travel of said cylinder, resilient means remote from said fluid controlled means cooperating therewith to further limit the speed of travel of said cylinder, and manually operable means to adjust said resilient means to vary the speed of travel of said cylinder.

12. In a shock absorber, a fluid-containing reservoir, a pair of pistons fixed against longitudinal movement in said reservoir, a cylinder slidably mounted on said pistons, means to reciprocate said cylinder, and means independent of said pistons to guide said cylinder during its reciprocations.

13. In a shock absorber, a fluid-containing reservoir, a pair of pistons fixed against longitudinal movement in said reservoir, the heads of said pistons being opposed to and spaced from each other, a cylinder slidably mounted on said pistons, a web in said cylinder dividing the space between the heads of said pistons into a pair of fluid-containing chambers, an inlet valve in each of said pistons permitting a flow of fluid from said reservoir into one of said chambers through one of said pistons upon movement of said cylinder in one direction, an outlet valve in each of said pistons permitting a flow of fluid from the opposite chamber into said reservoir through the opposite piston during movement of said cylinder in said direction, and means to reciprocate said cylinder.

14. In a shock absorber, a fluid-containing reservoir, a pair of pistons fixed against longitudinal movement in said reservoir, the heads of said pistons being opposed to and spaced from each other, a cylinder slidably mounted on said pistons, a web in said cylinder dividing the space between the heads of said pistons into a pair of fluid-containing chambers, an inlet valve in each of said pistons permitting a flow of fluid from said reservoir into one of said chambers through one of said pistons upon movement of said cylinder in one direction, an outlet valve in each of said pistons permitting a flow of fluid from the opposite chamber into said reservoir through the opposite piston during movement of said cylinder in said direction, means to reciprocate said cylinder, and resilient means associated with each of said outlet valves to limit the speed of travel of said cylinder.

15. In a shock absorber, a fluid-containing reservoir, a pair of pistons fixed against longitudinal movement in said reservoir, the heads of said pistons being opposed to and spaced from each other, a cylinder slidably mounted on said pistons, a web in said cylinder dividing the space between the heads of said pistons into a pair of fluid-containing chambers, an inlet valve in each of said pistons permitting a flow of fluid from said reservoir into one of said chambers through one of said pistons upon movement of said cylinder in one direction, an outlet valve in each of said pistons permitting a flow of fluid from the opposite chamber into said reservoir through the opposite piston during movement of said cylinder in said direction, means to reciprocate said cylinder, and resilient means associated with each of said outlet valves but remote therefrom to limit the speed of travel of said cylinder.

16. In a shock absorber, a fluid-containing reservoir, a pair of pistons fixed against longitudinal movement in said reservoir, the heads of said pistons being opposed to and spaced from each other, a cylinder slidably mounted on said pistons, a web in said cylinder dividing the space between the heads of said pistons into a pair of fluid-containing chambers, an inlet valve in each of said pistons permitting a flow of fluid from said reservoir into one of said chambers through one of said pistons upon movement of said cylinder in one direction, an outlet valve in each of said pistons permitting a flow of fluid from the opposite chamber into said reservoir through the opposite piston during movement of said cylinder in said direction, means to reciprocate said cylinder, resilient means associated with each of said outlet valves but remote therefrom to limit the speed of travel of said cylinder, and means to adjust said resilient means to vary the speed of travel of said cylinder.

17. In a shock absorber, a fluid-containing reservoir, a pair of pistons fixed against longitudinal movement in said reservoir, the heads of said pistons being opposed to and spaced from each other, a cylinder slidably mounted on said pistons, a web in said cylinder dividing the space between the heads of said pistons into a pair of fluid-containing chambers, an inlet valve in each of said pistons permitting a flow of fluid from said reservoir into one of said chambers through one of said pistons upon movement of said cylinder in one direction, an outlet valve in each of said pistons permitting a flow of fluid from the opposite chamber into said reservoir through the opposite piston during movement of said cylinder in said direction, each of said outlet valves comprising a slidable sleeve having a port therein in constant communication with said reservoir and having a port therein normally closed and adapted to be brought into communication with said reservoir upon movement of said sleeve, and means to reciprocate said cylinder.

18. In a shock absorber, a fluid-containing reservoir, a pair of pistons fixed against longitudinal movement in said reservoir, the heads of said pistons being opposed to and spaced from each other, a cylinder slidably mounted on said pistons, a web in said cylinder dividing the space between the heads of said pistons into a pair of fluid-containing chambers, an inlet valve in each of said pistons permitting a flow of fluid from said reservoir into one of said chambers through one of said pistons upon movement of said cylinder in one direction, an outlet valve in each of said pistons permitting a flow of fluid from the opposite chamber into said reservoir through the opposite piston during movement of said cylinder in said direction, each of said outlet valves comprising a slidable sleeve having a port therein in constant communication with said reservoir and having a port therein of greater area than said first port normally closed and adapted to be brought into communication with said reservoir upon movement of said sleeve, and means to reciprocate said cylinder.

19. In a shock absorber, a fluid-containing reservoir, a pair of pistons fixed against longitudinal movement in said reservoir, the heads of said pistons being opposed to and spaced from each other, a cylinder slidably mounted on said pistons, a web in said cylinder dividing the space between the heads of said pistons into a pair of fluid-containing chambers, an inlet valve in each of said pistons permitting a flow of fluid from said reservoir into one of said chambers through one of said pistons upon movement of said cylinder in one direction, an outlet valve in each of said pistons permitting a flow of fluid from the opposite chamber into said reservoir through the opposite piston during movement of said cylinder in said direction, means to reciprocate said cylinder, resilient means associated with each of said outlet valves but remote therefrom to limit the speed of travel of said cylinder, means to adjust said resilient means to vary the speed of travel of said cylinder, and a rocker lever connecting each of said outlet valves and its cooperating resilient means.

20. In a shock absorber, a fluid-containing reservoir, a pair of pistons fixed against longitudinal movement in said reservoir, the heads of said pistons being opposed to and spaced from each other, a cylinder slidably mounted on said pistons, a web in said cylinder dividing the space between the heads of said pistons into a pair of fluid-containing chambers, an inlet valve in each of said pistons permitting a flow of fluid from said reservoir into one of said chambers through one of said pistons upon movement of said cylinder in one direction, an outlet valve in each of said pistons permitting a flow of fluid from the opposite chamber into said reservoir through the opposite piston during movement of said cylinder in said direction, means to reciprocate said cylinder, resilient means associated with each of said outlet valves but remote therefrom to limit the speed of travel of said cylinder, means to adjust said resilient means to vary the speed of travel of said cylinder, and an angularly disposed rocker lever in said reservoir connecting each of said outlet valves and its cooperating resilient means.

21. In a shock absorber, a fluid-containing reservoir, a pair of pistons fixed against longitudinal movement in said reservoir, a cylinder slidably mounted on said pistons, means to reciprocate said cylinder, fluid controlled means and resilient means associated with each piston to control the speed of travel of said cylinder, and manually operable means to adjust said resilient means independently of each other.

22. In a shock absorber, a fluid-containing reservoir, a pair of pistons fixed against longitudinal movement in said reservoir, the heads of said pistons being opposed to and spaced from each other, a cylinder slidably mounted on said pistons, an imperforate web in said cylinder dividing the space between the heads of said pistons into a pair of fluid-containing chambers, means to reciprocate said cylinder, and means carried by each of said pistons to control the speed of travel of said cylinder.

In testimony whereof, I have signed my name to this specification.

CHARLES E. HARRIMAN.